Mar. 6, 1923.

A. H. NEULAND.
BATTERY CHARGING SYSTEM.
ORIGINAL FILED DEC. 17, 1917.

1,447,318.

Alfons H. Neuland
INVENTOR.

BY

Rosenbaum, Stockbridge & Borst
ATTORNEYS.

Patented Mar. 6, 1923.

1,447,318

UNITED STATES PATENT OFFICE.

ALFONS H. NEULAND, OF JERSEY CITY, NEW JERSEY, ASSIGNOR TO NEULAND ELECTRICAL COMPANY, INC., A CORPORATION OF NEW YORK.

BATTERY-CHARGING SYSTEM.

Original application filed December 17, 1917, Serial No. 207,509. Divided and this application filed July 11, 1921. Serial No. 483,700.

*To all whom it may concern:*

Be it known that I, ALFONS H. NEULAND, a citizen of Russia, residing at Jersey City, in the county of Hudson and State of New Jersey, have invented certain new and useful Improvements in Battery-Charging Systems, of which the following is a full, clear, and exact description.

My invention relates to battery charging systems, and embodiments of my invention are serviceable for charging storage batteries used in conjunction with generators in which the speed and load are variable, such as the power transmission for motor vehicles, disclosed in my application Serial Number 207,509 which has matured as Patent Number 1,392,349, October 4th, 1921, and of which this application is a division, although the utility of my invention is not confined to any particular type of generator apparatus.

One of the objects of my invention is to provide a system which will be economical and will permit the use of a battery composed of relatively few cells with an electromagnetic power transmission wound for a relatively high voltage. In accordance with my invention the battery is connected in series with a shunt field winding on the generator, and the charging current is controlled by the shunt field current. Means are provided for rendering the battery and shunt currents independent of each other, which means include an equalizer in the form of a third or auxiliary brush on the commutator for carrying the difference between the battery and shunt currents when there is a difference. Means are also provided for preventing the rise of the charging current above the permissible maximum without affecting the shunt current.

I shall now describe the illustrated embodiment of my invention and shall thereafter point out my invention in claims.

The generator G is compound wound, having the series winding S and the shunt winding $s$. The battery B is charged by the shunt current, being in series with the shunt winding $s$. Means are provided, however, for rendering the battery and shunt circuits independent of each other and for inserting a resistance into the battery circuit when the charging current becomes too heavy. The means for rendering the two circuits independent may be termed an equalizer, and consists of a small brush $b'$ in the commutator of the armature of the generator G between the main brushes $b$. This brush $b'$ is connected to the shunt circuit at a point intermediate the battery B and the shunt winding $s$. The normal circuit of the battery B includes a circuit controlling switch $c$ controlled by an electro-magnet $m$ energized by the current of the shunt winding $s$, and this switch $c$ is arranged in parallel with a resistance $r$.

Figure 1:
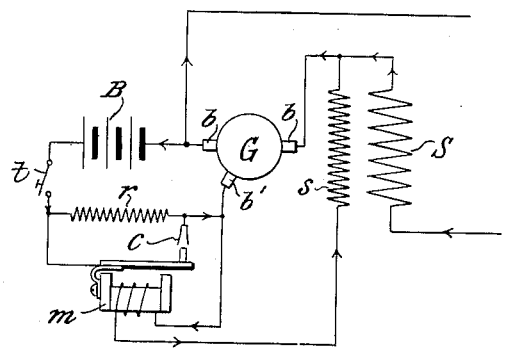
Figure 1 is a diagram of the electrical circuits of a system embodying my invention.
Figure 2:
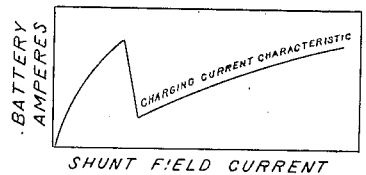
Figure 2 is a diagram showing the curve of the battery charging current plotted against the shunt field current.

As the speed and load upon the generator armature increase, its voltage increases in proportion thereto, and therefore the shunt current also increases in proportion to the voltage. When a maximum battery charging current has been reached, the electro-magnet $m$ opens the switch $c$ and the resistance $r$ is inserted into the battery circuit. This cuts down the charging current to a fraction of the maximum value and thereafter the voltage may rise to a considerable value before a maximum battery charging current is reached again. The characteristic of the charging current and its control by the shunt current are illustrated in Figure 2, the sudden drop representing the insertion of the resistance. The field shunt current, of course, continues to rise, and since upon the opening of the switch $c$ and the insertion of the resistance $r$, the charging and shunt currents vary, brush $b'$ thereupon becomes operative as an equalizer and carries the difference. Under normal operating conditions the auxiliary brush $b'$ carries little or no current since there is but little difference between the charging and shunt field currents, and it is principally when the switch opens that this brush is called upon to carry a substantial equalizing current.

Due to the fact that the switch $c$ is controlled by the shunt current, it will be observed that the switch will remain in actuated position, irrespective of the resultant sudden rise or fall of the charging current. The current in the shunt winding is dependent on the armature voltage only, and since the battery charging current is also dependent upon the voltage, the rise and fall of the current in the shunt winding very effectively and at the proper time actuates the switch c, and, as stated, holds it in actuated position despite the sudden rise or fall of the battery charging current due to the actuation of the switch.

A manually controlled switch t in the battery circuit may be employed to avoid short circuiting of the battery through the armature when the generator is stationary.

It is obvious that various modifications may be made in the construction shown in the drawings and above particularly described within the principle and scope of my invention.

I claim:

1. In combination with a generator armature including a commutator and main brushes and a generator field having a shunt winding, a battery charging system comprising a storage battery connected across the main brushes in series with the shunt winding, an auxiliary brush arranged between the main brushes and connected to the shunt conductor between the battery and shunt winding, and means for varying the resistance of the battery circuit.

2. In combination with a generator armature including a commutator and main brushes and a generator field having a shunt winding, a battery charging system comprising a storage battery connected across the main brushes in series with the shunt winding, an auxiliary brush arranged between the main brushes and connected to the shunt conductor between the battery and shunt winding, and a circuit controlling switch in the battery circuit arranged to be controlled by the current in the shunt winding.

3. In combination with a generator armature including a commutator and main brushes and a generator field having a shunt winding, a battery charging system comprising a storage battery connected across the main brushes in series with the shunt winding, an auxiliary brush arranged between the main brushes and connected to the shunt conductor between the battery and shunt winding, and a resistance adapted to be included in the battery circuit and arranged under the control of the shunt field current.

4. In combination with a generator armature including a commutator and main brushes and a generator field having a shunt winding, a battery charging system comprising a storage battery connected across the main brushes in series with the shunt winding, an auxiliary brush arranged between the main brushes and connected to the shunt conductor between the battery and shunt winding, and a resistance and switch arranged in parallel in the battery circuit between the battery and the auxiliary brush connection, the switch being under the control of the current in the shunt winding so that the increasing shunt current actuates the switch and inserts the resistance in the battery circuit.

In witness whereof, I hereunto subscribe my signature.

ALFONS H. NEULAND.